(12) United States Patent
Krymskiy et al.

(10) Patent No.: US 6,607,769 B1
(45) Date of Patent: Aug. 19, 2003

(54) SYSTEM FOR CORING LETTUCE HEADS

(76) Inventors: Kiv Krymskiy, 9242 Gross Point Rd., Skokie, IL (US) 60077; Hector Chavez, 8449 Karlov, Skokie, IL (US) 60077

( * ) Notice: Subject to any disclaimer, the term of this patent is extended or adjusted under 35 U.S.C. 154(b) by 140 days.

(21) Appl. No.: 09/723,502

(22) Filed: Nov. 28, 2000

(51) Int. Cl.$^7$ ................................. A23N 4/12
(52) U.S. Cl. ................ 426/484; 426/518; 83/932
(58) Field of Search .................. 426/482, 484, 426/518; 83/932; 99/542, 547, 551, 564, 549, 550

(56) References Cited

U.S. PATENT DOCUMENTS

| 1,578,355 | A | * | 3/1926 | Olney | |
|---|---|---|---|---|---|
| 1,766,824 | A | * | 6/1930 | Jones | |
| 3,527,276 | A | * | 9/1970 | Guilford | 146/106 |
| 3,612,124 | A | * | 10/1971 | Cunningham et al. | 146/52 |
| 4,099,456 | A | * | 7/1978 | Cornish | 99/638 |
| 4,453,458 | A | * | 6/1984 | Altman | 99/544 |
| 4,581,990 | A | * | 4/1986 | Matsumoto | 99/538 |
| 5,074,203 | A | * | 12/1991 | Hirtle et al. | 99/544 |
| 5,129,591 | A | * | 7/1992 | Sundquist | 241/282.2 |
| 6,036,989 | A | * | 3/2000 | Ellis | 426/484 |

FOREIGN PATENT DOCUMENTS

| BE | 19850319 A | * | 3/1985 |
|---|---|---|---|
| EP | 352077 A1 | * | 1/1990 |
| EP | 552902 A1 | * | 7/1993 |
| EP | 655891 | * | 12/1997 |

* cited by examiner

*Primary Examiner*—Keith Hendricks
*Assistant Examiner*—Drew Becker
(74) *Attorney, Agent, or Firm*—Paul H. Gallagher

(57) ABSTRACT

The apparatus includes a plurality of cutter blades arranged around a vertical central axis. The lettuce head is placed above the cutter blades, with the core directed downward, and it is pushed downwardly against the cutter blades, and the cutter blades cut into the head, around the core. The core is thereby cut out, and it falls out and discarded.

7 Claims, 6 Drawing Sheets

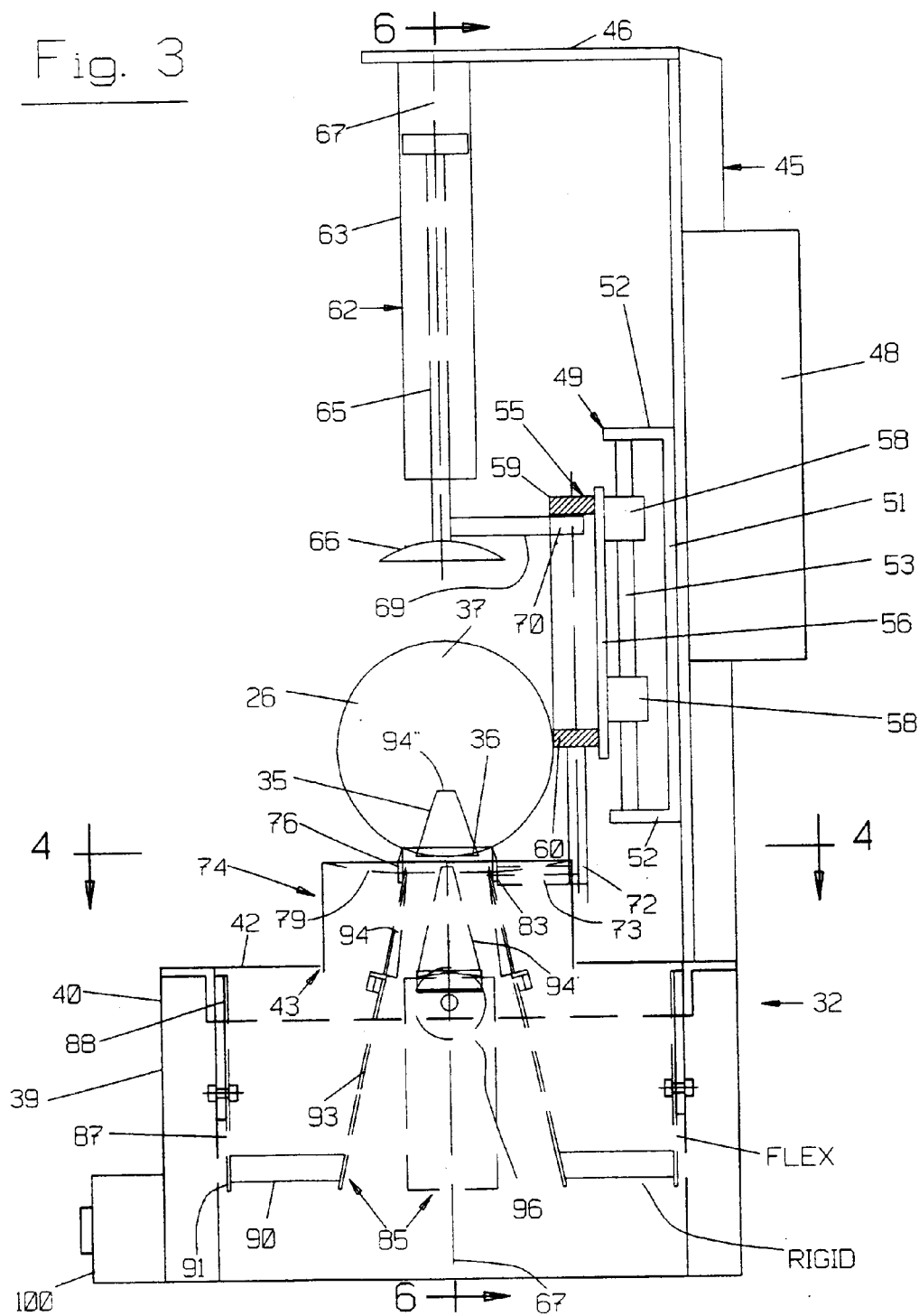

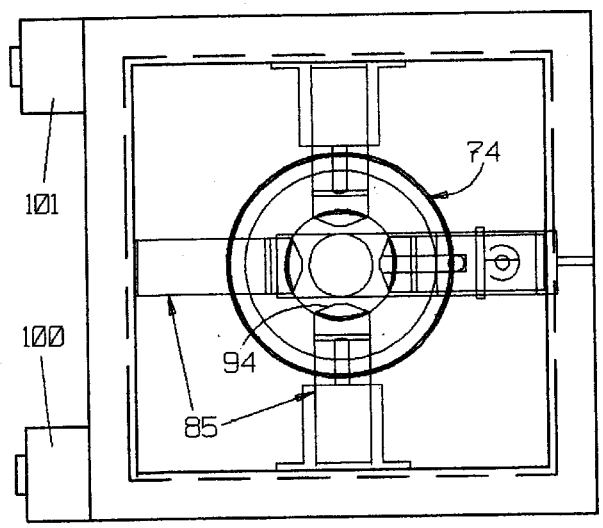
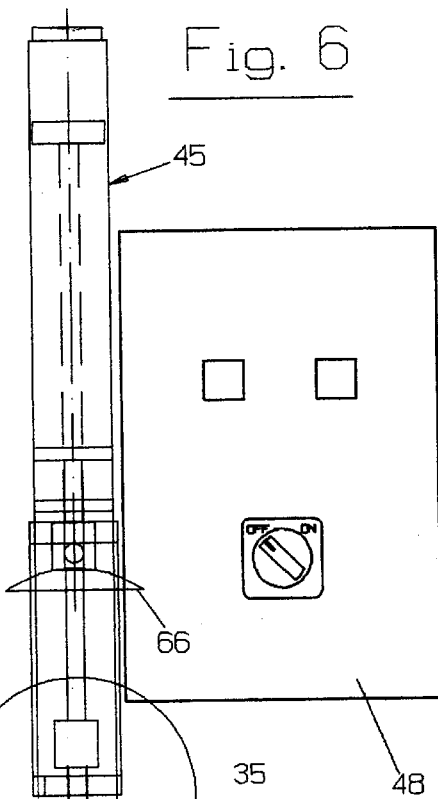
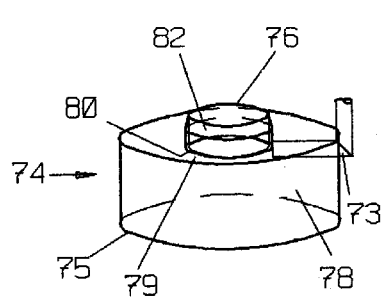
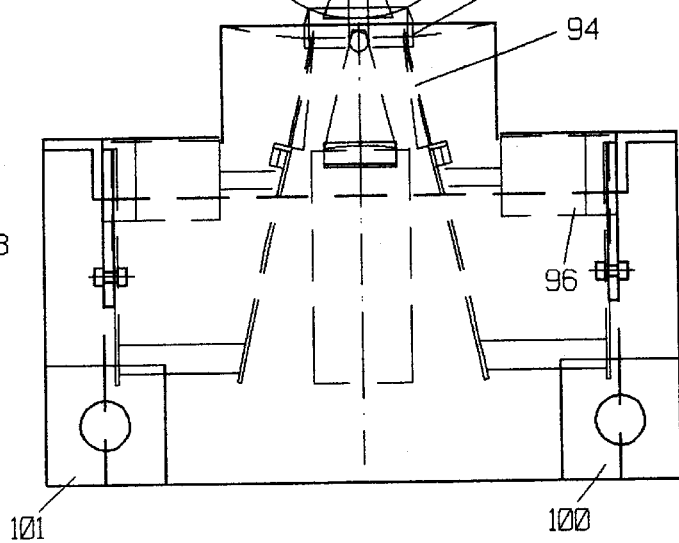

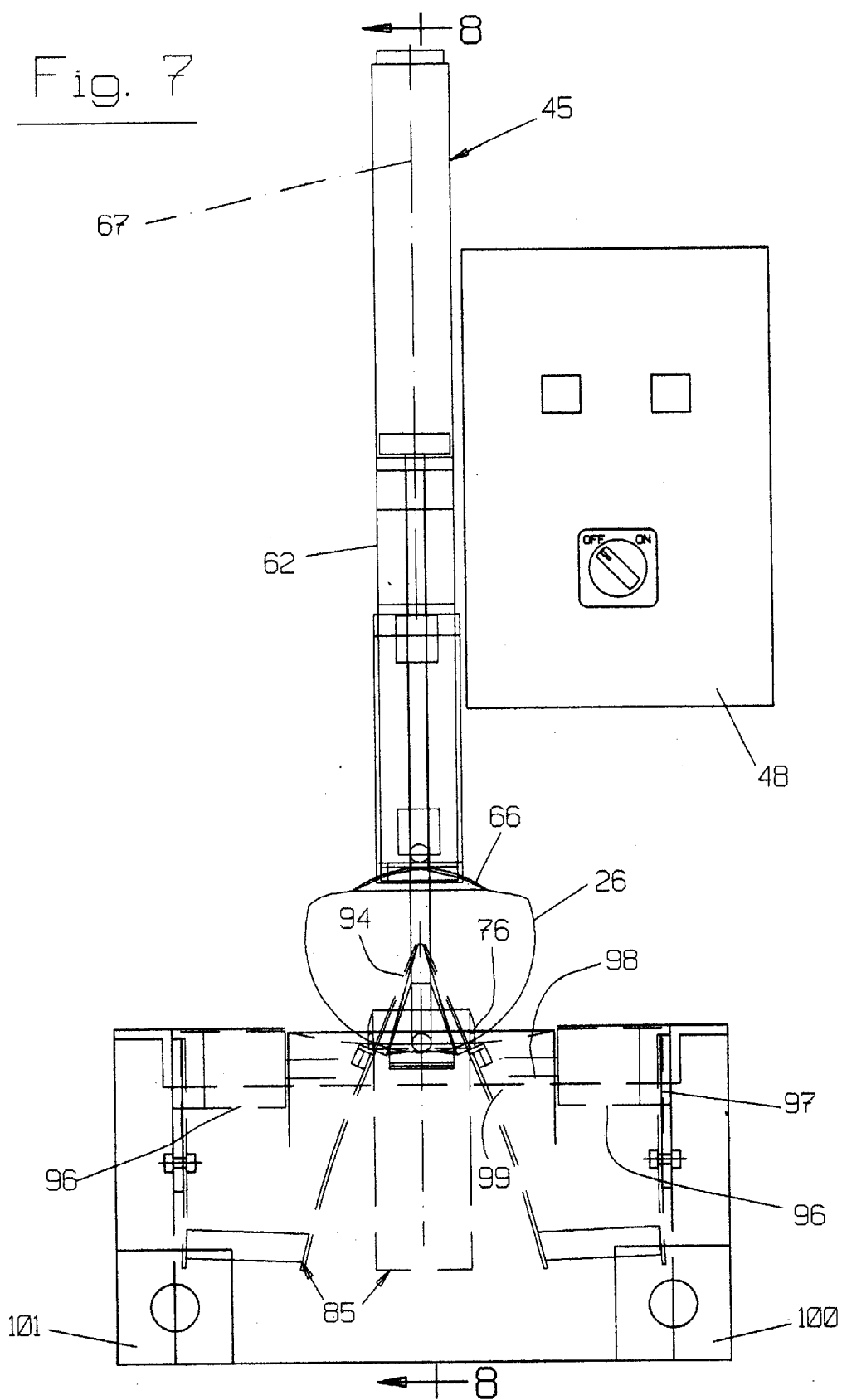

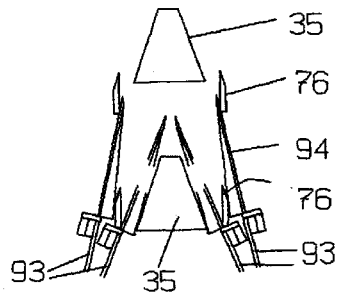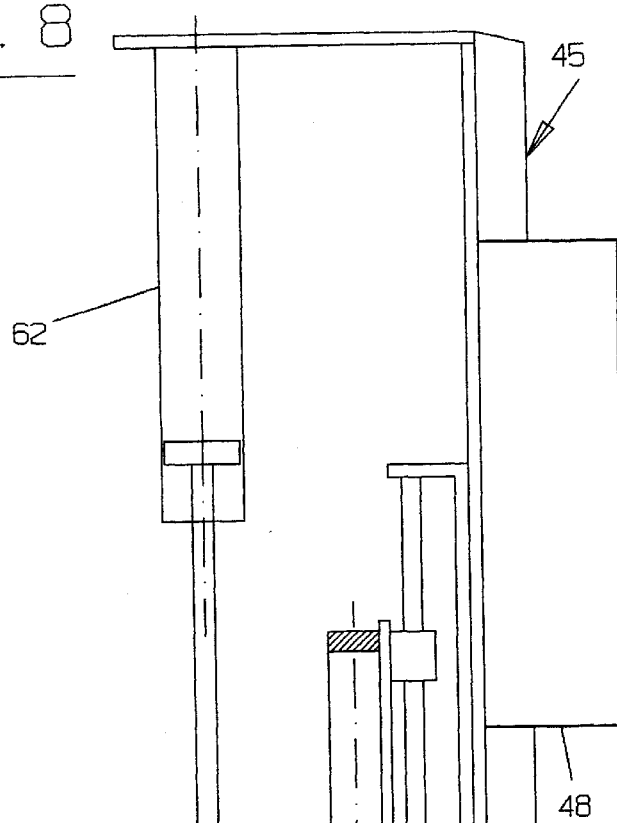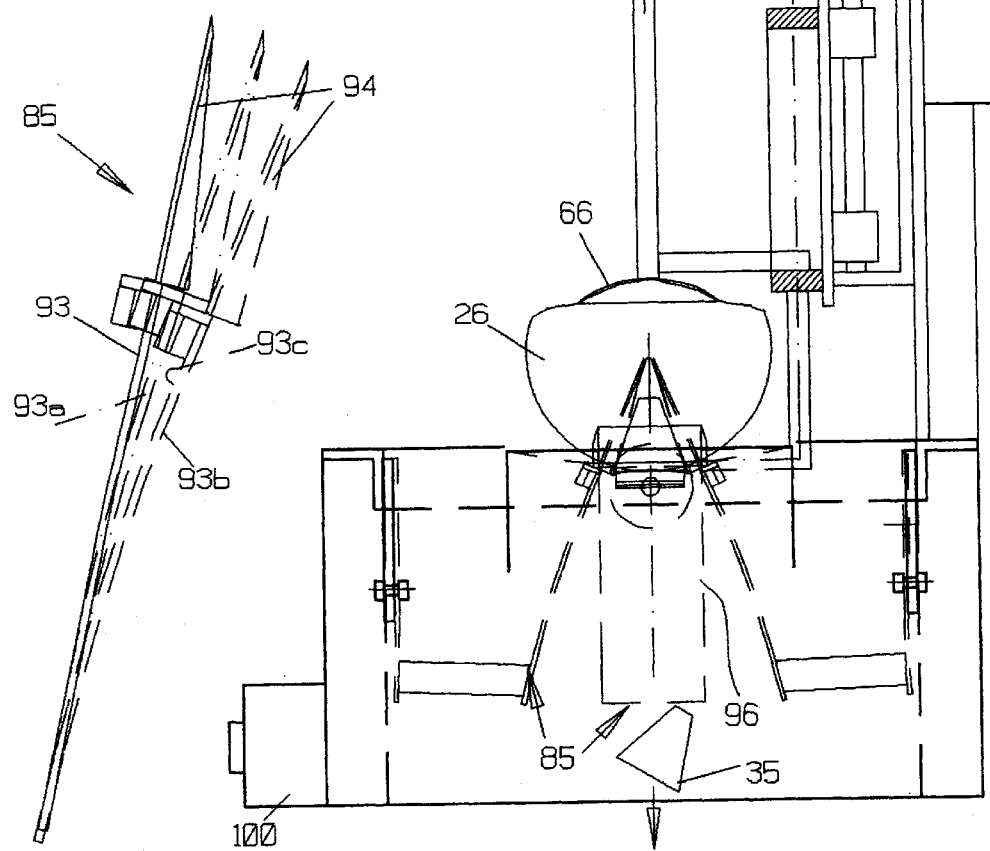

SYSTEM FOR CORING LETTUCE HEADS

FIELD OF THE INVENTION

The invention resides in the field of treating vegetables in their original condition as harvested, for sale to retailers and consumers. It has to do especially with lettuce heads and similar items. Heretofore this coring step was done manually, i.e. by holding the head in one hand, and cutting out the core with a knife in the other hand.

Such coring operation as heretofore performed was very time consuming, and it resulted in an immense waste of the body of the lettuce head.

SUMMARY OF THE INVENTION

A main object of the invention is to provide apparatus for overcoming the above difficulties.

A more specific object is to provide such apparatus having the following features and advantages;
1) the actual cutting out of the core from the lettuce head is done by mechanical apparatus;
2) the coring step is performed very rapidly;
3) the piece that is cut from the head, that constitutes the hard core, is the only part of the head that is cut out, leaving almost no part of the leaves attached to the core, thereby substantially eliminating waste of the leaves which constitute the edible part.
4) The lettuce head is placed in the machine with the core facing downwardly which helps put it in exact positions.

BRIEF DESCRIPTIONS OF THE INDIVIDUAL FIGURES OF THE DRAWINGS

FIG. 3 is a large scale view, showing the apparatus of the invention, constituting the upper part of FIG. 1, and showing the interior of the lower part of the apparatus.

FIG. 4 is a sectional view taken at line 4—4 of FIG. 3.

FIG. 5 is a respective view of a cover member, covering a portion of the elements in the apparatus.

FIG. 6 is a sectional view taken at line 6—6 of FIG. 3, which shows the lettuce head in position for a first increment of the cutting operation to be performed.

FIG. 7 is a view similar to FIG. 6 but showing the head moved downwardly relative to FIG. 6, showing a first increment of cutting the lettuce head.

FIG. 8 is a vertical sectional view taken at line 8—8 of FIG. 7.

FIG. 9 is a fragmentary view of certain internal elements and their positions relative to the cutting steps, corresponding to FIGS. 6 and 8 respectively.

FIG. 10 is a fragmentary view showing one of the cutter blades in each of three different positions.

DETAILED DESCRIPTION OF THE DRAWINGS

As used herein, system includes apparatus and method.

Figure 1:
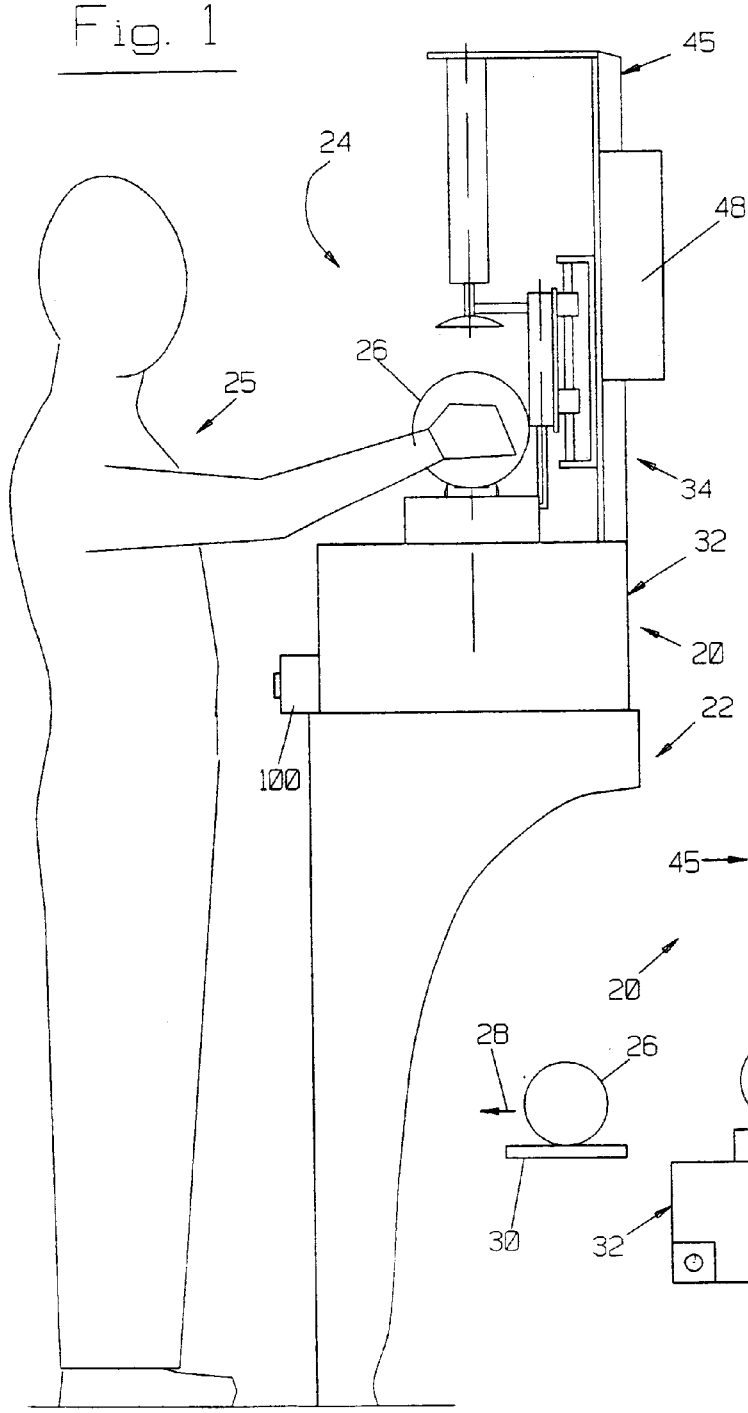
FIG. 1 is a side elevational view of the device of the invention, with most details omitted, showing an operator in position in operating it.
Figure 2:
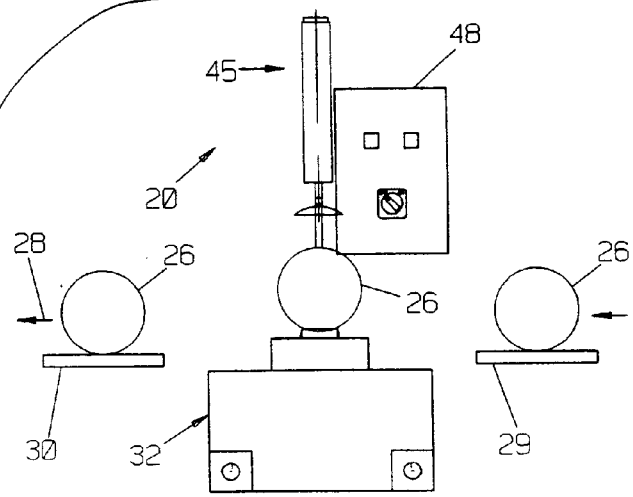
FIG. 2 is a small-scale diagrammatic view taken from the left of FIG. 1 and omitting the operator.

The entire apparatus of the invention, identified 20 is shown in FIG. 1, resting on a bench or table 22. The front side of the apparatus is indicated 24 where an operator 25 is located in operating it. Reference is made to FIG. 2 which is a diagrammatic view of the device 20 representing steps in the operation.

A lettuce head to be cored is shown at 26 in FIG. 2, and the direction of movement of the lettuce heads is indicated by the arrows 28. In the present case one head is shown resting on a table or board 29 from which it is picked up by the operator; another table or board 30 is provided, on which the heads are placed after being cored. The tables 29–30 are representative, and other instrumentalities may be used instead, such as a basket, conveyor, etc.

As is known, the lettuce head is generally in the form of a ball, or sphere, which may be for example 8–10" in diameter, and it has a core 35 (see FIG. 3) which is relatively small. The core is in the form generally of a cone, having a large end 36 exposed to the exterior. Surrounding the core are leaves 37 making up the remainder of the head. The core is dense and the leaves making up the remainder of the head are less dense, and the cutting of the core is at a location closely adjacent the core, leaving a minimum of the leaves, or stubs, attached to the core, so that the core itself, or dense substance, is removed from the head. Certain elements of the mechanical operation will be referred to below, in connection with separating the core from the remainder of the head.

The apparatus 20 (FIG. 1) includes a base member 32 and a superstructure 34. Certain elements in FIG. 1 are relatively small but reference is made to FIG. 3 showing those elements in larger scale, along with elements.

The base member 32 constitutes a frame for supporting the various components, and is in the form of a box. It has vertical supporting members 39, a surrounding wall 40, and a top 42 which has a central hole 43 to be referred to again hereinbelow.

The superstructure 34 includes a main column 45 rigidly connected to the base member, (FIG. 3), at the rear of the latter, the column having a turned over top element 46. An electrical control panel 48 (FIGS. 1,6) may be mounted on the column.

A slide control rack 49 (FIG. 3) is mounted on the inner side of the column 45, having a back plate 51 rigidly secured to the column. The rack 49 has upper and lower parallel end elements 52 to which a slide shank 53 is secured.

Another component in the superstructure is a slide 55, having a back plate 56 with slide bearings 58 sliding on the shank 53. The member 55 includes upper and lower elements 59, 60, for engagement by an arm 69 for moving the slides, as referred to below.

A vertical, double-acting power cylinder 62 has a cylinder 63 secured to the upper member 46 on the column, and a piston 65 extending out of the lower end, on the lower end of which is mounted a pusher plate 66. A main vertical axis 67 is shown extending through the power cylinder, and this may be considered the main axis of the apparatus, for referencing the various operating parts in the operation of the apparatus.

A horizontal arm 69 has an inner end secured to the piston 65 at the lower end of the latter, and an outer end 70 extending to the slide member 55. The outer end is positioned between the upper and lower elements 59, 60, for engaging those elements for sliding the slide member on the shaft 53, as referred to below. Extending downwardly from the lower element 60 is a shaft 72, having a lower horizontal extension 73, to be referred to again hereinbelow.

Attention is directed to FIG. 5 showing a cover unit 74 also shown in FIG. 3. This cover unit includes a cover 75 and a cutter ring 76. The cover 75 includes a surrounding cylindrical wall 78 and a top element 79 rigidly secured to the surrounding wall. The top element 79 may be of generally relatively flat conical shape, with its concave surface directed upwardly, and having a central hole 80. The cutter ring 76 has a cutting edge 82 for making an initial cut in the lettuce head as referred to below. The extension 73 of the shank 72, referred to in connection with FIG. 3, extends through the surrounding wall 78 of the cover unit and is securely welded thereto as shown at 83 in FIG. 3. This cover unit when installed in the machine is concentric with the main vertical axis 67 (FIG. 3).

The cover unit 74 is positioned in the hole 43 in the top cover element 42 of the base unit. This cover, unit moves vertically relative to the frame of the base unit in the operation of the machine. Its upper position is shown in FIG. 3, and its lower position in FIG. 7.

Located within the base unit 32 are a plurality of arms 85 (FIGS. 3,6,7,8), in this case four. These arms are movable radially, relative to the axis 67. Each arm includes an outer, vertical link 87, fixedly secured at 88 to a member of the frame; secured to the lower end of the link 87 is another link 90, of rigid construction, positioned generally horizontally, with an outer end secured to the lower end of the link 87, at 91; secured to the inner end of the link 90 is a flexible link 93 which extends generally upwardly, but is disposed at an inwardly directed angle; mounted on the upper end of the link 93 is a cutter blade 94. The cutter blades 94 are wedge-shape as viewed radially, having sharp side cutting edges 94' and a dull terminal point 94".

Figure 11:
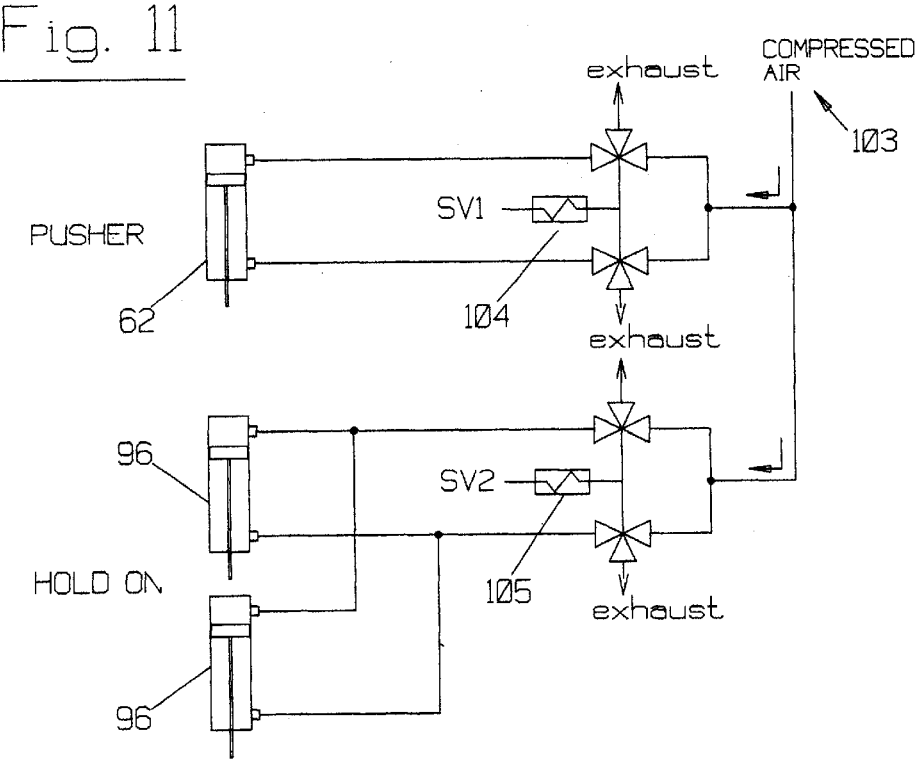
FIG. 11 is a diagram of the mechanical operating forces of the apparatus.

The operating mechanism also includes a pair of double-acting, holding power cylinders 96, as shown in FIGS. 6 and 7. There are two of these power cylinders, a point of significance in connection with the presence of four arms 85, as referred to below. These cylinders 96 are mounted on elements of the frame, as indicated at 97, and their pistons 98 extend radially inwardly and engage, at certain times, the corresponding arms 85 at 99, on radially opposite sides of the apparatus. In operating the apparatus, it is initially put into operation manually, and then it operates automatically throughout a cycle and automatically shuts off. In the next step, to treat another head of lettuce, it is again put into operation and it operates through a cycle and then automatically stops. The power means and the electrical controls therefor are shown in FIGS. 11 and 12 and will be described hereinbelow.

Figure 12:
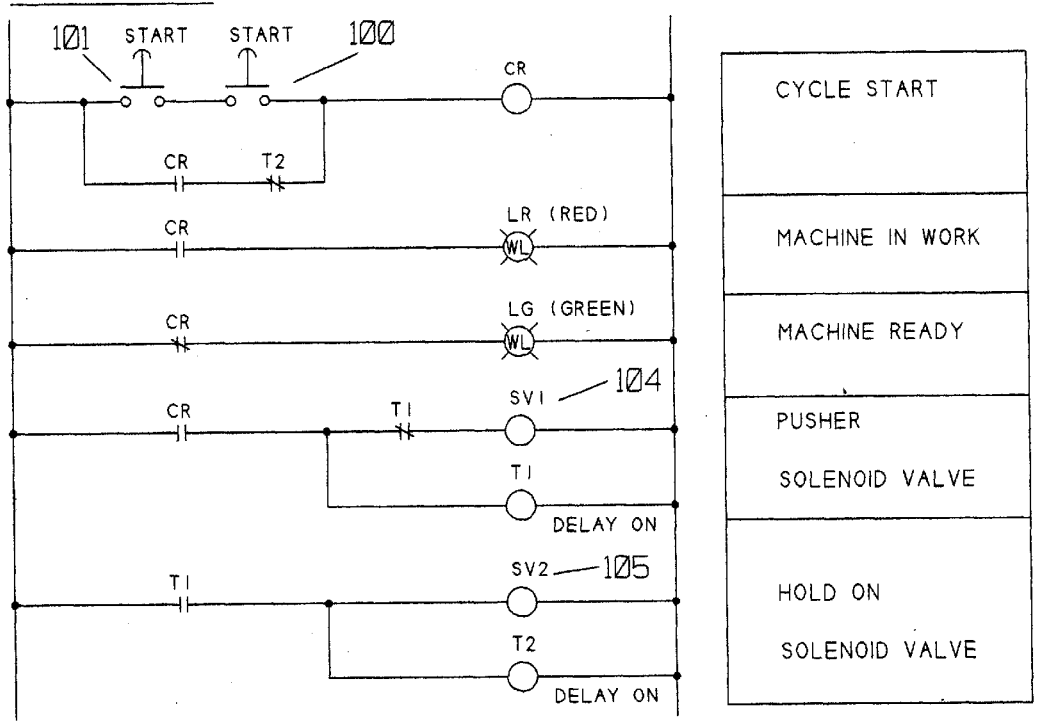
FIG. 12 is a diagram of the circuit, with legends, for controlling the operation of the apparatus.

The apparatus is first put into operation by manually actuating the switches 100, 101, these switches being in series for providing a safety factor (see also FIG. 12).

As an initial step in the operation, the operator grasps a lettuce head 26 (FIG. 2 see right hand side) and places it in the machine as shown in FIGS. 1 and 3, resting on the cutter ring 76 (FIG. 5). It is so placed with the core facing downwardly. He then actuates the switches 100, 101 and pursuant to the internal law of operation of the components of FIGS. 11 and 12, the power cylinder 62 is actuated; at the end of one cycle of operation, the operator then removes the lettuce head from the machine and puts it on the outgoing table 30 (FIG. 2).

In the initial portion of this operation, the piston 65 (FIG. 3) is pushed down, and the pusher plate 66 engages the top surface of the lettuce head, and pushes the head downwardly against the cutter ring 76 (FIG. 7) which penetrates into the head a short distance, to the depth of the cutter ring. Upon continued downward movement of the piston 65, moves the arm 70 down which engages the lower element 60 which, in turn, acting through the arm 73, pushes the cover unit 74 down. The cover unit then enters into the base unit.

The cover unit carries the ring downwardly in a further cutting action, as referred to below.

In this continuing action the cutter ring engages the cutter blades 94 which are angularly arranged, and move them radially inwardly. Consequently as the head is moving downwardly and the blades are moving inwardly, a conical cut is made in the head, cutting the core out.

In this action, the arms 85 flex in the desired direction. As noted above, they flex in radial directions, due to the flexibility of the links 93, 87. In FIG. 9 the links 93 are shown in full lines in their normal inactive positions, and shown in dot-dash lines in their inner positions. The arms 85 are self-biased radially outwardly and they bias the cutter blades outwardly when the cutter blades are not engaged by the cutter ring 76, but yield to the inward force of the cutter ring.

The rack 52 (FIG. 3) limits the downward movement of the slide 55 and thus limits the extent to which the cover unit is pushed down into the base unit and thereby limits the flexing movements of the arms 85.

After a time delay, as provided for in the circuit of FIG. 12, the various operating components are moved back into their original inactive positions, under the action of the reverse movement of the power cylinder 62.

FIG. 7 shows the positions of the arms 85 in their extreme inner position. It will be understood that the foregoing action caused the cutter blades to penetrate into the lettuce head up to the upper end, or inner end, of the core. Upon retraction of the power cylinder 62, the lettuce head is free to be lifted off, in so far as the action of the power cylinder 62 is concerned. However it is possible, on occasion, that the core may not be cut cleanly from all of the leaves in the head. The cutting action produces a freeing of the core from the leaves, but if there is a small part of the leaves still adhering to the core, that may be sufficient to carry the core away with the leaves. To prevent this action, the power cylinders 96 are provided (FIG. 7). These power cylinders are arranged diametrically oppositely, as indicated above, and at the completion of the cutting step, these power cylinders are actuated and the pistons are extended, radially inwardly, to hold the corresponding arms 85 inwardly. The other two arms 85 are not affected by this action. These two opposite arms 85 will be sufficient to hold the core against being carried away by ball of leaves. These power cylinders are reversed at the end of the cycle.

After the pusher plate 66 (FIG. 3) is raised, the lettuce head is freed, and the operator then grasps that head and places it on the outgoing table or shelf 30 (FIG. 2). Thereupon the operating cycle terminates.

FIG. 11 shows the main power cylinder 62, and the hold on power cylinders 96 (FIG. 7), all of which derive power from a supply source 103.

Referring to the electrical circuit, attention is directed to FIG. 12 which includes the starting switches 100, 101 in series. Closing these switches requires both hands, which forms a safety feature. Upon closing both these switches, the circuit is completed according to the symbols and legends in the circuit. The steps in the operation of the apparatus will be apparent from this circuit, and it will be seen that the last phase of this step is the delay action shown at the bottom of the circuit. These delay actions control the valves 104, 105, of which the solenoids are shown.

The arms 85 flex to different degrees in different portions thereof, as shown in FIG. 10, this being the result of the flexibility of two of the links 93 and 87 in the arms 85, as represented in FIG. 10. In this figure, the arm 85 is shown in solid lines in its normal outer position; when it is flexed inwardly, it assumes a position shown at 93*a* in dot-dash lines, which represents a simple bending inwardly of the link 93, as in FIG. 9. However the link 93 can assume compound curves, as represented at 93*b*, that is, it may bend in a simple bend at its lower end, and then flex in the opposite direction at an upper position as indicated at 93*c*, producing a compound bend. The effect of this is that, in the actual cutting step the cutter will progressively move to a more flat position to form a broader flat space through which the corer will fall.

What is claimed is:

1. A method of coring a vegetable head having a ball of leaves and a core in the ball, the core being tapered and having a small end within the ball and a large end exposed to the exterior, comprising the steps:

placing the head in position for coring, with the large end of the core directed downwardly;

putting the large end of the core inside of a circular cutter ring, then continuing to move the head, together with the circular cutter ring downwardly against cutting blades, and in this step directing the ends of the cutting blades into the head and forming a circular cut in the head around the core; moving the top edges of the cutter blades together by means of the circular cutter ring and combining the movement of the head and cutter blades together to form a conical shape of the cut in the ball of leaves, and around the core.

2. The method according to claim 1 and including the further steps, utilizing dull cutting blades and utilizing flexible springs to move the dull portions of the cutting blades against the core to thereby realign the core, and thereby the head, to place the head in position in alignment with the cutting blades.

3. The method according to claim 2 wherein, in the last step the cutting blades remain in the same bodily position but the head moves relative to the cutting blades.

4. The method according to claim 1, and including the step of:

continuing the cutting around the core to the inner end of the core.

5. A method of coring a vegetable head having a ball of leaves and a core in the ball, the core being tapered and having a small end within the ball and a large end exposed to the exterior, arranging a plurality of cutting blades in a circle, utilizing a circular cutter to make a cylindrical cut and guide the cutting blades, forming a tapered cut in the ball around the inner end of the core by utilizing the cutting blades, thereby cutting all of the leaves from the core and separating the core from the leaves by holding the core with the cutting blades and pulling the ball of leaves away from the core.

6. The method of claim 3 wherein the recited cutting steps constitute the only cutting steps in the method.

7. The method of claim 5 wherein, the core has a central first axis, and the cutting blades are arranged around a central second axis, and arranging the head in performing the steps with the first axis at an angle to the second axis, and in applying the cutting blades in the step of making the tapered cut, also utilizing the cutting blades to engage the core so as to move the core with the ball of leaves, angularly to move the axes to a coaxial position.

\* \* \* \* \*